J. A. SINGMASTER AND F. G. BREYER.
APPARATUS FOR MANUFACTURING LITHOPONE.
APPLICATION FILED AUG. 14, 1920.

1,411,647. Patented Apr. 4, 1922.
7 SHEETS—SHEET 1.

Inventors
James A. Singmaster
Frank G. Breyer
By their Attorneys
Pennie, Davis, Marvin & Edmonds

UNITED STATES PATENT OFFICE.

JAMES A. SINGMASTER AND FRANK G. BREYER, OF PALMERTON, PENNSYLVANIA, ASSIGNORS TO THE NEW JERSEY ZINC COMPANY, OF NEW YORK, N. Y., A CORPORATION OF NEW JERSEY.

APPARATUS FOR MANUFACTURING LITHOPONE.

1,411,647.     Specification of Letters Patent.     Patented Apr. 4, 1922.

Application filed August 14, 1920. Serial No. 403,525.

*To all whom it may concern:*

Be it known that we, JAMES A. SINGMASTER and FRANK G. BREYER, residing at Palmerton, county of Carbon, State of Pennsylvania, have invented certain new and useful Improvements in Apparatus for Manufacturing Lithopone; and we do hereby declare the following to be a full, clear, and exact description of the invention, such as will enable others skilled in the art to which it appertains to make and use the same.

The present invention relates to the manufacture of lithopone and has for its object the provision of an improved apparatus for muffling lithopone.

In the manufacture of lithopone, the precipitate of zinc sulphite and barium sulphate resulting from the interaction of solutions of zinc sulphate and barium sulphide is filter-pressed and, after appropriate drying, is heated or muffled and the hot product plunged directly from the heating chamber into cold water. It has heretofore been customary, in actual practice, to carry out the muffling of the raw or crude lithopone in horizontal muffles, and to this end a layer of crude lithopone is charged on to the bottom of the muffle and heated, usually to a dull red heat. In the usual muffling operation, that portion of the lithopone lying on the highly heated bottom of the muffle is liable to be overheated, while other portions of the charge may not be sufficiently heated. An attempt is made to avoid the effect of this non-uniformity of heating by stirring the material from time to time. This is only a partial remedy, entails the use of skilled labor, and increases the difficulty of maintaining the proper atmosphere in the muffle.

The necessity of a proper atmosphere protecting the lithopone from oxidizing influences during the muffling operation has heretofore been recognized and, in certain cases, it has been customary to introduce a neutral or reducing gas, such, for example, as steam or producer gas, into the muffle, so as to maintain a neutral or reducing atmosphere above the charge and prevent the ingress of air.

As heretofore generally practiced, the muffling of lithopone has been an intermittent operation. The crude lithopone is charged into the muffle through a charging door, and after the completion of the muffling the hot product is manually withdrawn from the muffle into a body of cold water, and thereupon a new charge is put into the muffle. During the charging and discharging operations, the temperature of the muffle necessarily falls, and some time is required to bring a fresh charge to the desired muffling temperature. Moreover, this intermittent operation is wasteful of heat. In addition, the amount of lithopone which can be effectively treated at one operation is smaller than the cubical capacity of the muffle; or, in other words, the depth of the charge in the muffle is kept relatively small compared with the vertical height of the muffle in an attempt to cut down as much as possible overheating or underheating of portions of the material. This means a relatively large space in the muffle above the charge, with the attendant difficulties of maintaining non-oxidizing gases therein and excluding the air therefrom.

In the copending application of Breyer, Croll and Farber, Serial No. 327,921, filed October 2, 1919, the existence of critical muffling temperatures for lithopones of given properties is, as far as we are aware, recognized for the first time. The vital importance of controlled and uniform heating for the production of such superior lithopones is set forth in this application, and the present invention contemplates in particular the provision of an improved apparatus for the muffling of lithopone in a uniform and controlled manner. At the same time, the apparatus of the invention enables lithopone to be muffled by a practically continuous and automatic operation. In our copending application, Serial No. 342,523, filed December 4, 1919, we have described and claimed an improved method of muffling lithopone, and the present invention is particularly directed to the provision of an apparatus for carrying out the method of muffling described and claimed in that application.

The apparatus of the invention comprises a vertically disposed and externally heated retort or muffle of appropriate proportions for uniformly heating the lithopone as the latter is progressively passed therethrough. Preferably, the action of gravity is relied upon for effecting the passage of the lithopone through the vertical retort. We have found that in a vertical muffle, through which the material passes by gravity with little or no agitation, there is a relationship between the cross section and length of the muffle employed which can not be exceeded without producing a non-uniform muffled product. We believe that the carrying of the heat in such a muffle to the center of the column is largely due to its being transferred by the rising gases present, in addition to direct conduction. When the cross section is unduly increased, we believe that channeling of the gases takes place with consequent non-uniformity of the muffled product. We do not wish to restrict ourselves to this theory although it now appears the plausible explanation for the phenomenon we have observed. We do know, however, that the limits of this relationship between cross section and length are quite close, and we have, for example, found in actual practice that an iron tube twenty-five feet long and ten inches in diameter gives a uniform muffled product, whereas a tube of the same length and twelve inches in diameter gives a perceptibly non-uniform muffled product.

It is our present preferred practice to employ in the improved apparatus of the invention a vertically disposed cylindrical retort or muffle made of iron, or other good heat conducting material, of about ten inches in diameter and about twenty-five feet in length. If desired, the cylindrical retort may be of tapered section, for example, the retort may have intermediate its ends a portion whose diameter progressively increases from the top towards the bottom. Such a tapered section assists, to some extent, the ready passage by gravity of the lithopone through the retort.

The foregoing and other novel features of our improved apparatus for muffling lithopone will be better understood from the following description taken in conjunction with the accompanying drawings, in which.

In the apparatus illustrated in the accompanying drawings a plurality of vertically disposed retorts are operatively combined in one furnace unit. Thus, in the drawings, the four vertically disposed retorts 15 are combined in a single furnace unit. If desired, a plurality of furnace units may be placed side by side, but in the drawings we have illustrated, for convenience, only a single furnace unit. It will, of course, be understood that the principles of the invention may be satisfactorily embodied in a furnace having only a single retort, and we have, in fact, secured very excellent results with a single retort furnace of this type.

The retorts or muffles 15 may conveniently be made of a cylindrical pipe of wrought iron or extra heavy steel. The diameter and length of the pipe should be appropriately proportioned to insure uniform heating of the lithopone for the necessary period of time. We have secured excellent results with a wrought iron pipe ten inches in diameter and from twenty-five to thirty feet in length.

Figures 1, 7, 8:
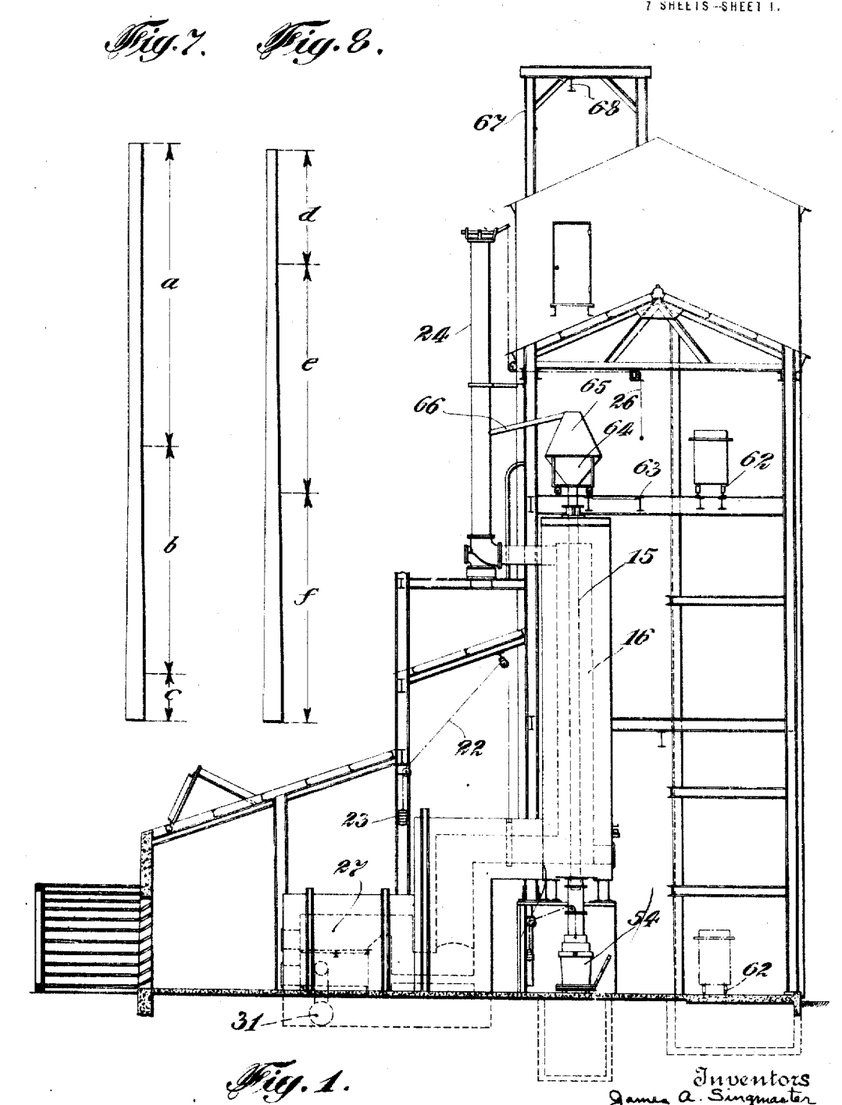
Fig. 1 is an end elevation of a structure designed for the accommodation of a lithopone muffling apparatus embodying the principles of the invention.
Figs. 7 and 8 are elevations of retorts of tapered section.

The cylindrical retort may be of uniform diameter throughout, or, if desired, may be tapered in cross section. In Fig. 7, the upper section $a$ (about sixteen feet in length) is of uniform diameter (say nine inches); the intermediate section $b$ (of about twelve feet in length) is of tapered section with the diameter progressively increasing from the top towards the bottom (for example, from nine inches to ten inches); while the lower section $c$ (of about two feet in length) has a uniform diameter (for example, ten inches). In Fig. 8 the upper section $d$ (say six feet in length) is of uniform diameter (for example, eight inches); the intermediate section $e$ (say twelve feet in length) is tapered (say from eight to nine inches in diameter); while the lower section $f$ (say twelve feet in length) is also of tapered section (for example, from nine to ten inches in diameter). The specific constructions illustrated in Figs. 7 and 8 are given merely by way of example, and it will be evident to those skilled in the art that the desired tapered section, when employed, may be secured in various ways.

Each of the retorts 15 is surrounded by a flue 16 for heating gases. The four retorts with their cooperating flues of the furnace unit are combined in a unitary furnace structure. It will be understood, however, that each retort has a separate and independent flue surrounding it, so that, in effect, there are four independent and individual retorts, each with its own individual external heating means, combined in each furnace unit. The brickwork of the furnace may advantageously consist of inner walls of fire brick 17 and outer walls of red brick 18. A space is preferably left between the fire brick walls 17 and the exterior red brick walls 18, and this space may advantageously be filled with heat-resisting and insulating material 19, such, for example, as powdered sil-o-cel or sil-o-cel brick.

The retorts 15 extend an appropriate distance above and beneath the furnace structure, but are otherwise surrounded throughout substantially their entire length by the co-operating flues 16. A port 20 is operatively associated with each flue 16 and serves to conduct heating gases to the lower end of the flue. The ports 20 are independent of one another and each is provided with an independently controlled damper 21. In the drawings, this damper is shown as a slab of fire brick or other appropriate refractory material which is vertically adjustable in the port 20 so as to vary the effective opening of the port. The dampers 21 may conveniently be adjusted by means of independent cables 22 and cooperating counterweights 23.

Each flue 16 near its top, communicates with a stack 24 for carrying away the exhaust heating gases from the flue. Each stack is provided with a valve or damper 25 for controlling the draft thereof. All of the dampers 25 are arranged to be adjusted from the retort charging floor by means of cables 26.

The four retorts of each furnace unit have a common combustion chamber 27 for the combustion of fuel and the generation of hot products of combustion for the supply of heating gases to the four flues 16. As represented in the drawings, the combustion chamber has a grate 28 suitable for the burning of coal and is provided with a pair of charging doors 29. For heating four retorts of the dimensions hereinbefore mentioned, we have found a grate of about seven feet in width and about six feet in length or depth to provide a satisfactory grate area when burning fine coal, say, for example, No. 2 or 3 buckwheat. An air compartment 30 is provided beneath the grate 28 and is arranged to be supplied with air under appropriate pressure from an air supply pipe 31. This air supply may be appropriately regulated by means of a damper 32. The air compartment 30 also serves as an ash pit for the ashes and cinders falling through the grate 28, and a pair of doors 33 are provided for removing ashes and cinders from the compartment 30.

The combustion chamber 27 terminates at its rear in a vertical passage 34 which communicates with the lower end of a heat equalizing chamber. The heat equalizing chamber has a manifold or compartment 35 at its lower end which is in free communication throughout its entire width with the passage 34. Above the manifold 35, the equalizing chamber is provided with a plurality of spaced arches 36 upon which are supported slabs 37 of fire brick or other appropriate refractory material. The vertically disposed slabs 37 are separated and spaced apart by blocks 38 of refractory material. The slabs 37 terminate at their upper ends substantially at the lower level of the ports 20, so that above the slabs 37 there is a manifold or compartment 38′ with which the ports 20 communicate.

The vertically disposed slabs 37 provide a plurality of vertical passages 39 of relatively large surface area. Thus, in a furnace of the dimensions hereinbefore mentioned, the passages 39 may be about three feet in length and about six feet in height, and the distance between the slabs 37 may advantageously be about nine inches. The slab 37, which may be from 4-5 inches in thickness, together with the interior walls of the equalizing chamber, provide a considerable mass of refractory material, thus providing within the equalizer a heat reservoir of considerable heat storage capacity.

The hot products of combustion pass from the chamber 27 down the passage 34 into the manifold 35 and upwardly through the vertical passages 39 into the manifold or distributor 38′ from whence they flow into the ports 20 which are provided for independently supplying the heating gases to the flues 16. Baffles 69 are preferably placed in the ports 20 in advance of the retorts 16 so as to protect the retorts from the direct blast of the incoming heating gases and so as to deflect and distribute these gases about the retorts. The heat equalizing chamber serves to overcome or compensate for such slight variations in the temperature of the products of combustion as necessarily occur in practice. Thus, the equalizing chamber has a plurality of passages of relatively large surface area, and has considerable heat storage capacity. By these agencies, slight variations in temperature of the products of combustion are effectively neutralized in the equalizer, so that the heating gases delivered to the flues 16 are of substantially uniform temperature and practically independent of the slight fluctuations in temperature which the hot products of combustion undergo.

The lower end of each retort 15 is provided with an appropriate discharging device. The construction and operation of the discharging device of the furnace illustrated in the drawings will be best understood by reference to Figs. 9, 10 and 11. The brickwork structure of the retort-section of the furnace is built above and supported by I-beams 40 which are themselves appropriately supported a convenient distance above the ground level to permit the discharge from the retorts and subsequent handling of the muffled product. The lower end of each retort 15 extends through a bracket 41 which is secured to the frame-work supported by the I-beams 40.

Figures 9, 12:
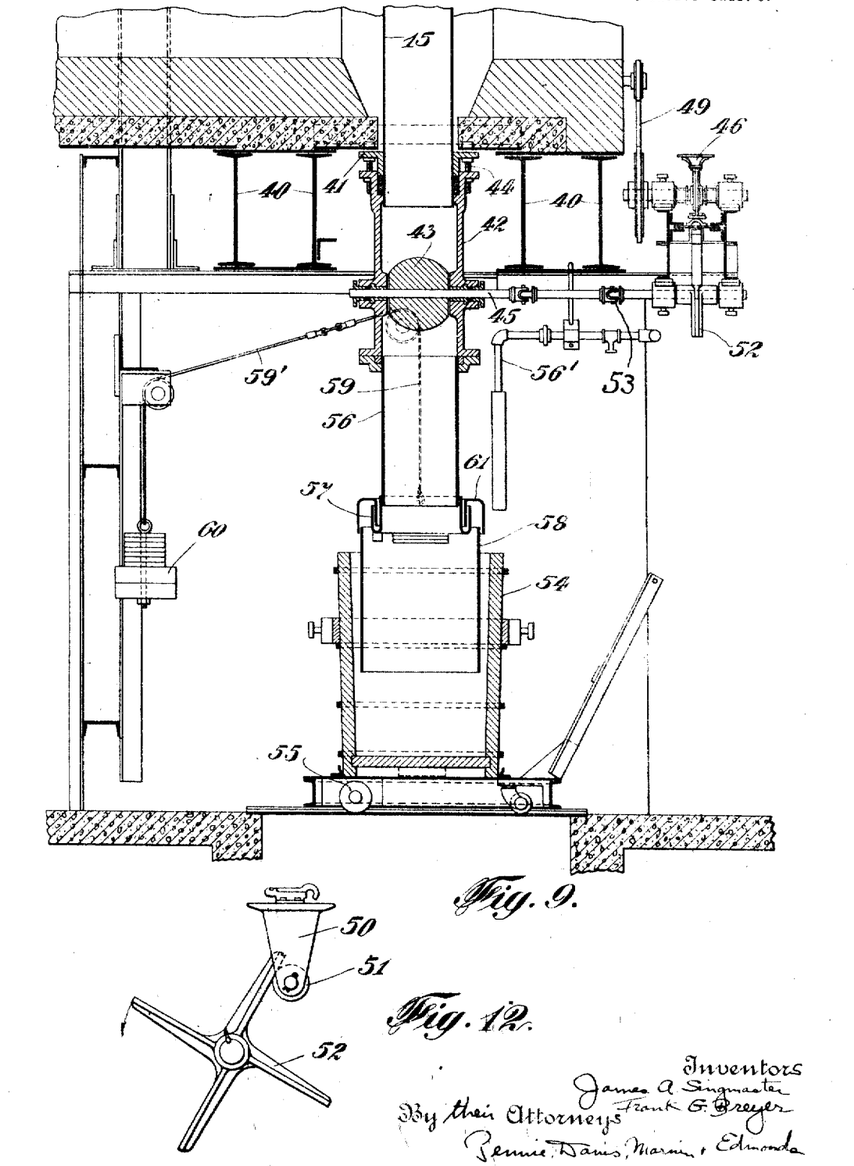
Fig. 9 is a sectional end elevation of the lower end of a retort and the associated apparatus and is taken on the section line 9—9 of Fig. 11.
Fig. 12 is a detail explanatory view.
Figure 10:
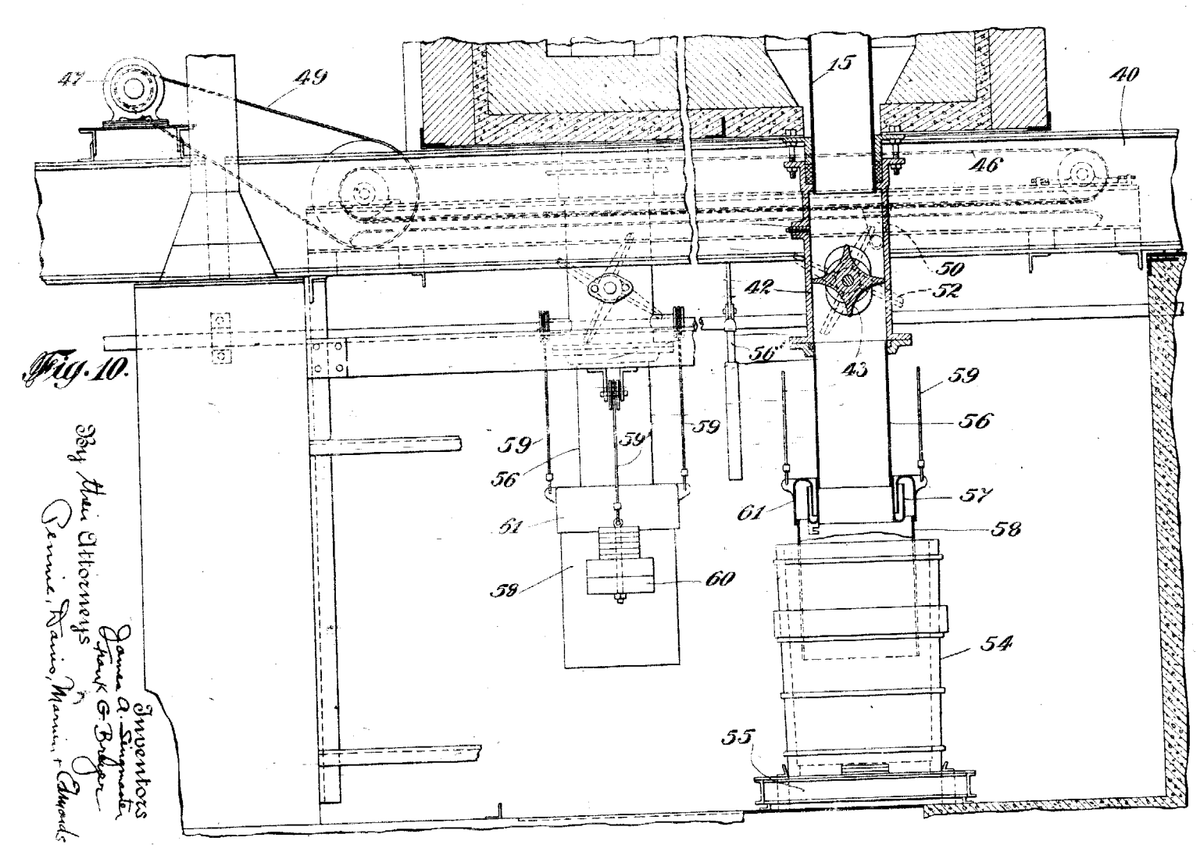
Fig. 10 is a sectional side elevation of the lower end of a retort and the associated apparatus and is taken along the section line 10—10 of Fig. 11.
Figure 11:
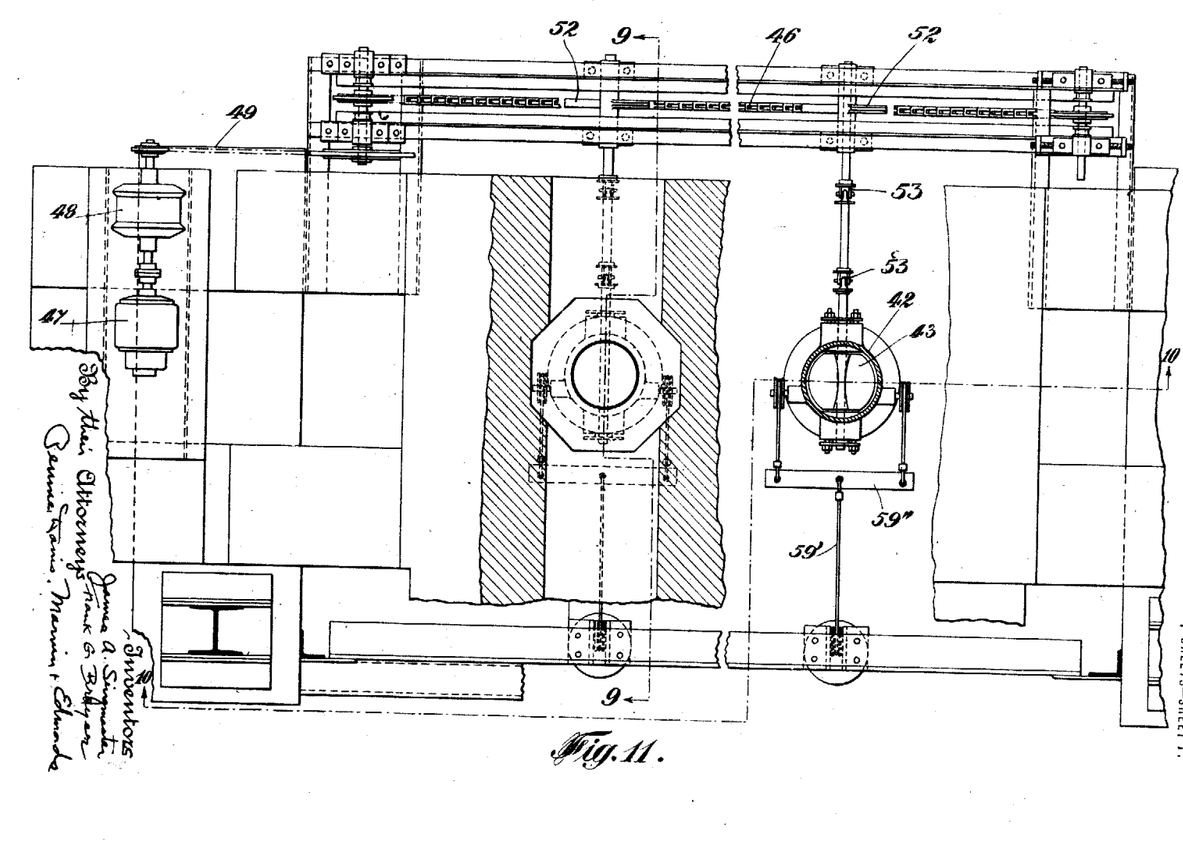
Fig. 11 is a sectional plan taken on the section line 11—11 of Fig. 10.

An extension or pipe section 42, having a star-wheel 43 rotatably mounted therein, is secured to the bracket 41 by bolts 44, so as to provide a substantially air-tight connection between the lower end of the retort 15 and the upper end of the extension 42. The star-wheel 43 has four blades or wings and is secured to a shaft 45 which is adapted to be periodically turned through an angle of 90°. The star-wheel 43 thus serves to discharge at periodical intervals of time a predetermined quantity of material from the retort 15.

The star-wheels 43 are preferably actuated by an automatic mechanism. In the furnace illustrated in the drawings this mechanism comprises a link belt or chain 46 driven at a uniform and relatively slow speed by any appropriate source of power, such, for example, as an electric motor 47, gear reducer 48 and link belt 49 (see Fig. 11). The link chain 46 carries a dog 50 having a roller 51 adapted to engage the arms of the star-wheel actuator 52 (see Fig. 12). The actuator 52 is connected to its cooperating star wheel 43 by a suitable connecting rod including a pair of universal joints 53.

The link chain 46 moves continuously at the desired uniform speed, and the roller 51 is thus periodically brought into contact with one of the arms of the star-wheel actuator 52. Each actuator 52 is thereby moved through a quarter of a complete turn and the cooperating star-wheel 43 is correspondingly turned and discharges from the retort a pretermined amount of the muffled product. It will be seen that the star-wheels 43 of the four retorts of each furnace unit have a common actuating mechanism by which the star-wheels 43 of the four retorts are operated in sequence at the desired time intervals.

A tub 54, usually of wood, and preferably mounted on a truck 55, is adapted to be placed directly beneath each of the vertically disposed retorts 15. In the muffling of lithopone, the tubs 54 contain an appropriate cooling liquid, such, for example, as cold water. In Figs. 9 and 10 of the drawings a water supply system 56' is indicated for filling the tubs 54 to the desired extent with cold water.

A sheet metal pipe 56 is secured to the lower end of the discharge extension 42. At its lower end, the pipe 56 carries a U-shaped trough 57 which is adapted to be filled with water or other appropriate sealing liquid. A pipe 58, of larger diameter than the pipe 56 but of smaller diameter than the tub 54, is suspended by a pair of cables 59. The cables 59 are attached to a cross arm 59" and the cross arm is connected to a counterweight 60 by a single cable 59'. The pipe 58 is concentrically positioned with respect to the pipe 56 and carries at its upper end an inverted U-shaped member 61 so positioned that its inner rim extends into the liquid in the trough 57, when the pipe 58 occupies its lowermost position, thereby providing a substantially air-tight seal between the pipes 56 and 58.

The pipe 58, when in its lowermost position, extends beneath the level of the cooling liquid in the tub 54, and when in this position the muffled product may be discharged from the retort 15 directly into the cooling liquid in the tub 54 without encountering any air or other oxidizing gases. When the tubs 54 are being changed, the pipe 58 may be raised by the cable 59' and counterweight 60 to a position above the top of the tub.

We have found that the pipe 58 may, if desired, be omitted. In this event, the muffled product falls through the pipe 56 into the liquid in the tub 54, and we have found that such exposure to air as the muffled product experiences during this fall has no prejudicial effect on the finished lithopone. Nor does the omission of the pipe 58 permit the entrance into the lower end of the retort of air in such quantity as to have any prejudicial effect upon the muffling operation. When the pipe 58 is employed in the manner hereinbefore described, the retort is effectively sealed at its lower end against the entrance of air.

The housing for the furnace structure is illustrated in Fig. 1 of the drawings. The lithopone is brought to the muffle house in trays such as are now used in drying the crude lithopone. These trays may conveniently be piled one above another on trucks 62. The trays of dried lithopone mounted on the truck 62 are elevated from the ground floor to the retort charging floor 63 of the furnace house. A charging hopper 64, preferably mounted on a truck, is operatively arranged directly above each retort 15. The lithopone is manually transferred from the trays on the trucks 62 into the hopper 64. If desired, the hopper 64 may have a hood 65 communicating by a pipe 66 with the cooperating stack 24 for carrying away the fumes and gases which are evolved at the top of the retort.

The furnace house has an elevated scaffold 67 carrying a suspended mono-rail 68. A crane or other appropriate elevating and transferring mechanism may be appropriately mounted on the rail 68 and can be moved the entire length of the furnace house for removing worn out or defective retorts and replacing the same with new retorts.

Figure 2:
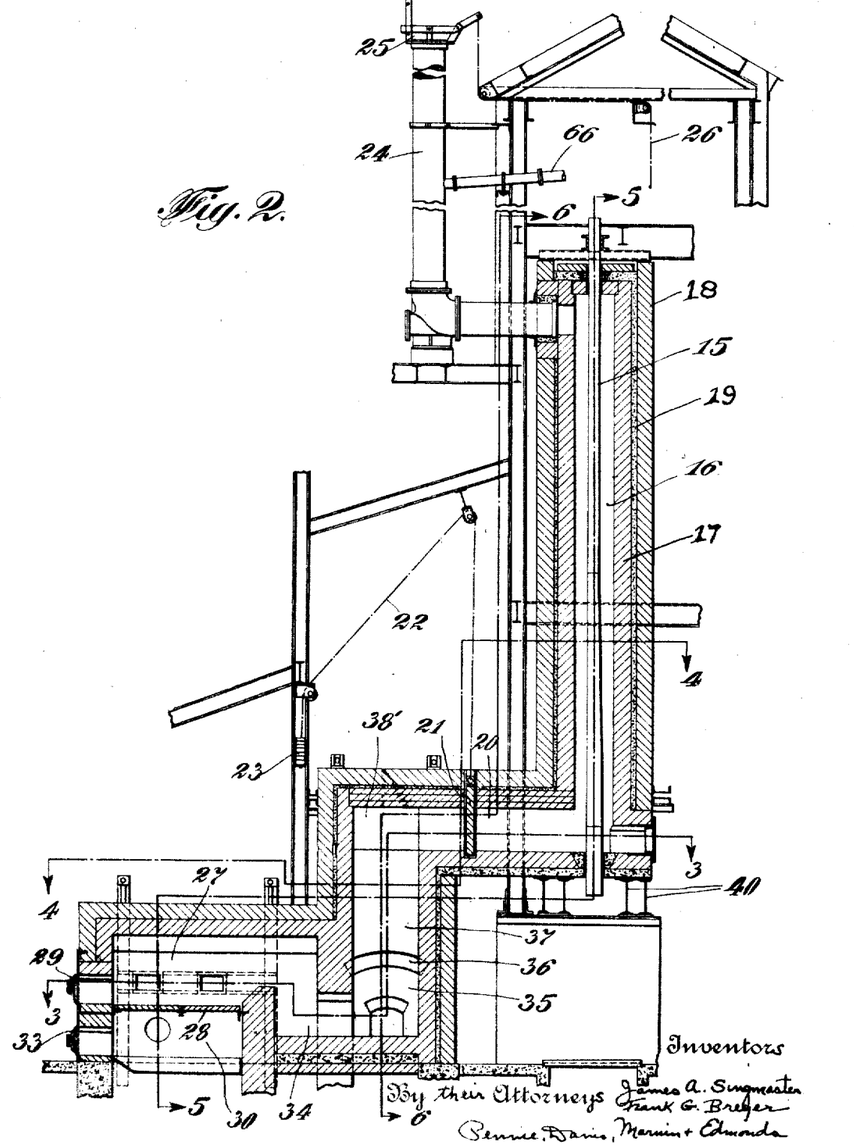
Fig. 2 is a sectional elevation of the muffling apparatus.
Figure 3:
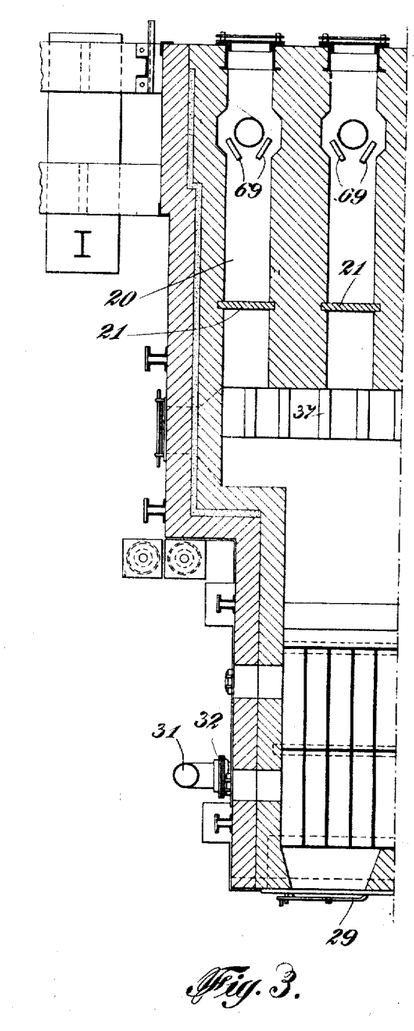
Fig. 3 is a sectional plan taken on the section line 3—3 of Fig. 2.
Figure 4:
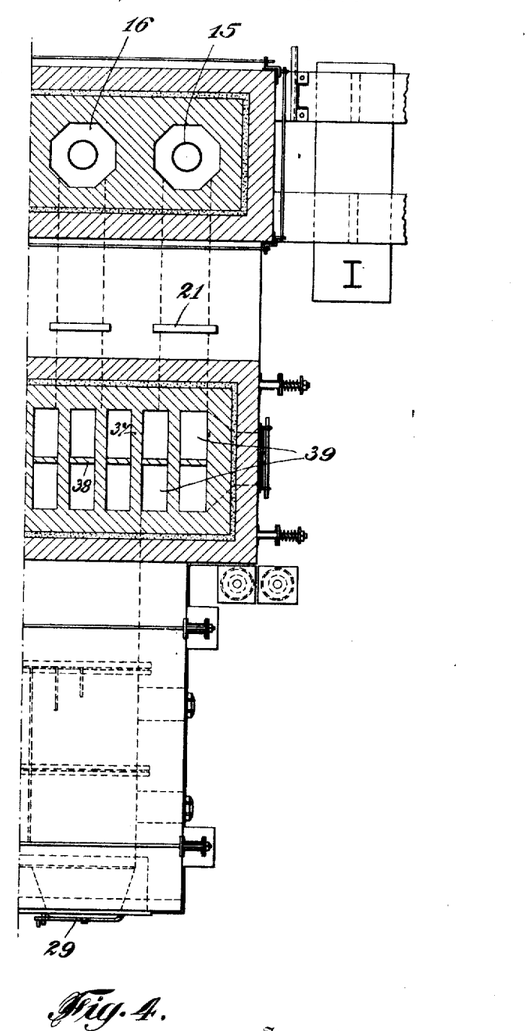
Fig. 4 is a sectional plan taken on the section line 4—4 of Fig. 2.
Figure 5:
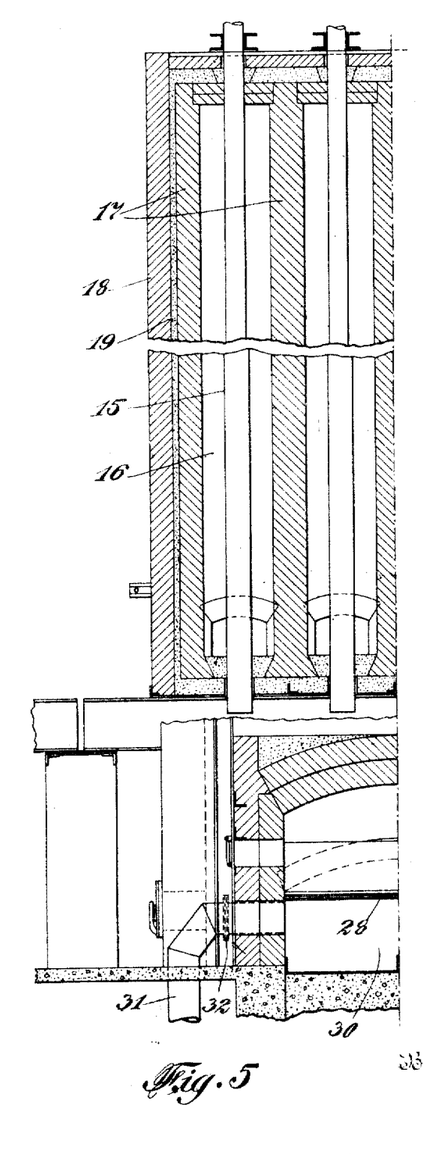
Fig. 5 is a sectional elevation taken on the section line 5—5 of Fig. 2.
Figure 6:
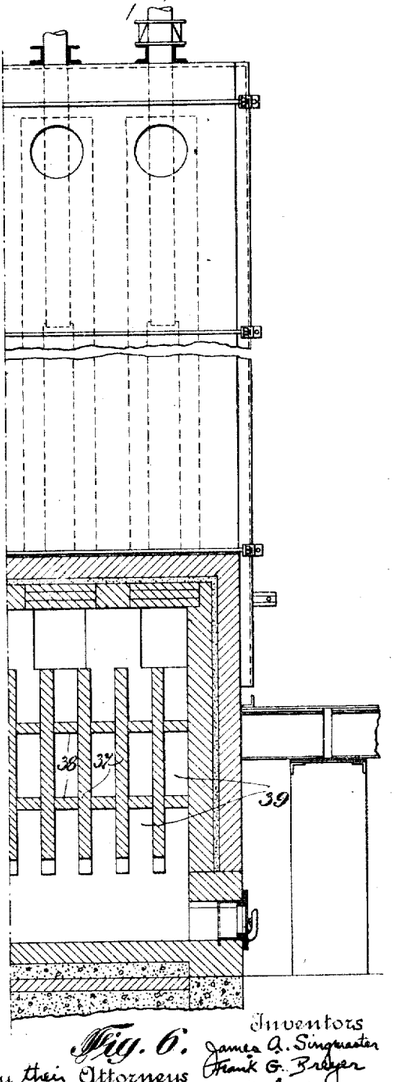
Fig. 6 is a sectional elevation taken on the section line 6—6 of Fig. 2.

For the sake of simplicity, the charging hopper has been omitted in Fig 2 of the drawings, and in Figs. 2, 5 and 6 the discharge devices for the retorts have been omitted. It will be understood that the furnace structure as well as the furnace house have appropriate supporting steel structures which have been generally indicated in the drawings but are not specifically described, since the general construction of the same will be understood by those skilled in the art.

In the normal operation of the apparatus illustrated in the drawings, the retorts 15 are filled with the crude and dried (or partially dried) lithopone. The crude lithopone, as it is charged into the top of the retorts, is generally in the form of small lumps and the spaces between these lumps, during the muffling operation, are filled with the gases evolved from the lithopone at the muffling temperature, so that the lithopone within the retort, during the entire muffling operation, is surrounded by a non-oxidizing atmosphere composed, for the most part, of hot water vapor. The gases driven off from the lithopone during the muffling operation escape through the open top of the retort. The amount of these gases and the design of the retort are such that there is maintained within the retort, and more especially in the active muffling zone thereof, a gaseous pressure slightly greater than atmospheric pressure whereby the entrance of air into the retort is effectively prevented.

In the upper part of the retort the incoming lithopone is subjected to the hot gases escaping from the active muffling zone of the retort. These hot gases serve to dry and preheat the lithopone, and more particularly they serve to drive off from the incoming lithopone any occluded or entrained air, so that when the lithopone reaches the active muffling zone practically all of the air entrained in the original raw lithopone has been eliminated. This insures the muffling of the lithopone under the desired non-oxidizing condition. As the result of this preheating stage in our muffling operation, we are able to feed into the retort a lithopone containing more moisture than has heretofore been possible in the usual lithopone muffles. For this reason, when muffling in accordance with our present invention, the lithopone need not be dried as thoroughly or as carefully as has heretofore been necessary. After filter-pressing, the crude lithopone ordinarily contains about 50% of moisture. It has heretofore been customary to dry the lithopone until its moisture content was reduced to about 1 or 2%. When muffling in accordance with our present invention, it is only necessary to dry the crude lithopone until its moisture content is about 10%, thereby materially reducing the cost of drying.

During the muffling operation, the lithopone is maintained in the active muffling zone of the retort at an appropriate muffling temperature for the necessary period of time to secure the desired degree of strength, color and brightness. We have found that excellent results may be obtained when the rate of discharging and charging of the retort is so proportioned that a period of from about 5 to 10 hours is required for the lithopone to travel from the top of the retort to the bottom thereof, during which period the lithopone is subjected to a temperature of from about 550° to 800° C., depending upon the nature of the crude material and the properties desired in the finished product.

The muffled lithopone, as will be understood by those skilled in the art, is removed from the water in the tubs 54 and subjected to further treatment, such as washing, grinding and drying, substantially in accordance with the present practice.

We have found that lithopone, muffled in accordance with the invention, possesses marked superior properties over lithopone heated in ordinary muffles in accordance with the heretofore customary practice. In particular, we have found that lithopone calcined in accordance with the invention is remarkably resistant to deterioration from sunlight. In other words, the muffling operation of the invention results in the production of a superior product having improved light-resisting properties.

The apparatus illustrated in the accompanying drawings represents our preferred construction, but it will, of course, be understood that the apparatus is susceptible of many modifications within the spirit and scope of the invention. In principle, the apparatus of the invention comprises a continuously operated vertical retort or muffle open at the top for the escape of gases and sealed, when desired, at the bottom to prevent the entrance of air into the retort. Various expedients may be employed for sealing the bottom of the retort, and likewise the desired opening at the top of the retort may take different forms. With respect to the opening at the top of the retort, it is only necessary to provide an escape for the gases resulting from the muffling operation at such a rate that within the active muffling zone of the retort there is maintained a gaseous pressure slightly in excess of the atmospheric pressure.

The construction of the retorts 15 of metal, such as wrought iron or extra heavy steel pipe is of especial advantage in the muffling of lithopone, since the high heat conductivity of the metal enables an economical use of the available heat and insures more uniform muffling conditions within the retort. If desired, the retort may be of a slightly tapered cross-sectional area, from above downwardly, throughout a part or the whole of its length, whereby the increase in the cross-sectional area of the retort from the top towards the bottom facilities the progressive passage of the lithopone therethrough.

The lithopone is progessively passed through the vertically disposed retort, so that the muffling operation in its entirety is a substantially continuous operation. The aforementioned relationship between the diameter and length of the retort is an important feature of the invention. In general, this relationship between the diameter and length of the retort must be such as to insure uniform muffling of the lithopone. By uniform muffling we mean that substantially no part of the lithopone is overheated and that substantially all of the lithopone is ultimately raised to the desired critical muffling temperature. For practical reasons, we prefer to employ a retort of about twenty-five to thirty feet in effective length, and with such a length of retort we find that the diameter of the retort should not exceed about ten inches for the most satisfactory results. Thus, we have secured excellent results with a ten-inch wrought iron retort whose length within the effective heating chamber was 25 feet; the retort having an over-all length of 30½ feet, 3 feet projecting above the heating chamber and 2½ feet extending below the heating chamber. However, while these are the dimensions which we now prefer to employ in practice, we wish it to be understood that the principle of the invention is not limited to a retort of these particular dimensions, since broadly the invention contemplates such a relationship between the diameter and effective length of the vertically disposed retort that substantially every particle of the lithopone is ultimately subjected to the desired critical muffling temperature, without any overheating, during the progressive passage of the lithopone therethrough.

We claim:

1. An apparatus for muffling lithopone, comprising an upright retort of good heat conducting material having a diameter not exceeding about twelve inches and a length of at least twenty-five feet.

2. An apparatus for muffling lithopone, comprising an upright cylindrical retort of iron having a diameter of approximately ten inches and a length of from about twenty-five to about thirty feet.

3. An apparatus for muffling lithopone, comprising a vertically disposed and externally heated cylindrical retort of good heat-conducting material having a diameter of approximately ten inches and a length of at least twenty-five feet.

4. An apparatus for muffling lithopone, comprising a vertically disposed and externally heated cylindrical retort of good heat-conducting material, said retort having intermediate its charging end and its discharging end a portion whose diameter progressively increases from the top towards the bottom.

5. An apparatus for muffling lithopone, comprising an upright retort of good heat-conducting material, said retort having intermediate its charging end and its discharging end a portion whose diameter progressively increases from the top towards the bottom, the maximum diameter of any portion of said retort not exceeding about twelve inches and the retort being at least twenty-five feet in length.

6. An apparatus for muffling lithopone, comprising a vertically disposed and externally heated cylindrical retort of iron, said retort being at least twenty-five feet in length and having intermediate its charging end and its discharging end a portion whose diameter progressively increases from the top towards the bottom, the maximum diameter of any portion of said retort not exceeding about twelve inches.

7. An apparatus for muffling lithopone, comprising a vertically disposed and externally heated cylindrical retort of iron, said retort being at least twenty-five feet in length and of a diameter not exceeding about twelve inches.

8. An apparatus for muffling lithopone, comprising a vertically disposed retort, a flue for heating gases surrounding the said retort, a combustion chamber for generating hot gases, a heat equalizing chamber, and means permitting the flow of hot gases from said combustion chamber through said equalizing chamber and upwardly through said flue for uniformly heating said retort.

9. An apparatus for muffling lithopone, comprising a vertically disposed retort, a flue for heating gases surrounding said retort, a combustion chamber for generating hot gases, a heat equalizing chamber provided with a plurality of passages of relatively large surface area formed by heat-refractory material of considerable mass, and means permitting the flow of hot gases from said combustion chamber through said equalizing chamber and upwardly through said flue for uniformly heating said retort.

10. An apparatus for muffling lithopone, comprising a vertically disposed retort, a flue for heating gases surrounding said retort, a combustion chamber for generating hot gases, a heat equalizing chamber having a plurality of spaced apart members of heat-refractory material of considerable mass vertically disposed therein and providing a plurality of vertical passages of relatively large surface area, a manifold communicating with said combustion chamber and in which the lower ends of all of said vertical passages terminate, and a manifold communicating with said flue and in which the upper ends of all of said vertical passages terminate.

11. An apparatus for muffling lithopone, comprising a plurality of vertically disposed retorts, a flue for heating gases surrounding each of said retorts, a common source of hot products of combustion for supplying heating gases to all of said flues, and an individual stack operatively associated with each of said flues for carrying away the exhaust heating gases.

12. An apparatus for muffling lithopone, comprising a plurality of vertically disposed retorts, a flue for heating gases surrounding each of said retorts, a stack operatively associated with each of said flues for carrying away the exhaust heating gases, means associated with each of said stacks for independently controlling the draft thereof, and a common source of hot products of combustion for supplying heating gases to all of said flues.

13. An apparatus for muffling lithopone, comprising a plurality of vertically disposed retorts, a flue for heating gases surrounding each of said retorts, a common source of hot products of combustion for supplying heating gases to all of said flues, means operatively associated with each of said flues for independently controlling the supply of heating gases to any one of said flues, and means operatively associated with each of said flues for independently controlling the exhaust of heating gases from any one of said flues.

14. An apparatus for muffling lithopone, comprising a plurality of vertically disposed retorts, a flue for heating gases surrounding each of said retorts, a common source of hot products of combustion for supplying heating gases to all of said retorts, a heat equalizing chamber provided with a plurality of vertical passages formed by heat refractory material, a lower manifold communicating with said combustion chamber and in which the lower ends of all of said vertical passages terminate, an upper manifold in which the upper ends of all of said vertical passages terminate, a port connecting the lower end of each of said flues with said upper manifold, a damper in each of said ports, and means for independently adjusting said dampers.

15. An apparatus for muffling lithopone, comprising a plurality of vertically disposed retorts, a flue for heating gases surrounding each of said retorts, a combustion chamber for generating hot gases, a heat equalizing chamber communicating with said combustion chamber, a port connecting the lower end of each of said flues with said heat equalizing chamber, a damper in each of said ports, means for independently adjusting said dampers, a stack connected near the upper end of each of said flues, and means for independently controlling the flow of exhaust gases through said stacks.

16. An apparatus for muffling lithopone, comprising a vertically disposed and externally heated retort, an automatic discharging mechanism operatively attached to the lower end of said retort, a pipe section depending from the lower part of said mechanism, and a vertically movable sealing device operatively associated with said pipe section.

17. An apparatus for muffling lithopone, comprising a vertically disposed and externally heated retort, a body of cooling liquid positioned beneath the lower end of said retort, and automatic means actuated at periodic intervals for discharging a predetermined quantity of the muffled product from said retort directly into said cooling liquid.

18. An apparatus for muffling lithopone, comprising a plurality of vertically disposed and externally heated retorts, a discharging device operatively associated with the lower end of each of said retorts, and automatic means actuated at periodic intervals for operating said devices for discharging a predetermined quantity of the muffled product from each of said retorts.

19. An apparatus for muffling lithopone, comprising a vertically disposed and externally heated retort, a body of cooling liquid positioned beneath the lower end of said retort, means for discharging a predetermined quantity of the muffled product from said retort, and vertically movable enclosing means operatively associated with the lower end of said retort and adapted to project beneath the surface of said liquid for providing a seal between said retort and said liquid.

20. An apparatus for muffling lithopone, comprising a vertically disposed and externally heated retort, a discharging device associated with the lower end of said retort, automatic means actuated at periodic intervals for operating said discharging device to discharge a predetermined quantity of the muffled product from said retort, a body of cooling liquid positioned beneath the lower end of said retort, and vertically movable enclosing means operatively associated with said retort below said discharging device and adapted to direct the product discharged from the retort into said body of cooling liquid.

21. An apparatus for muffling lithopone, comprising a vertically disposed metallic retort, means for externally heating said retort, and means at the top of the retort permitting the escape to the atmosphere of the gases driven off from the lithopone as a result of the calcining operation at such a rate as to maintain within the retort a pressure slightly greater than atmospheric pressure, whereby the entrance of air into the retort is prevented; substantially as described.

22. An apparatus for muffling lithopone, comprising a vertically disposed cylindrical retort of iron, means for externally heating said retort, means at the top of the retort permitting the escape to the atmosphere of the gases driven off from the lithopone as a result of the calcining operation at such a rate as to maintain within the retort a pressure slightly greater than atmospheric pressure, and sealing means at the bottom of the retort for preventing the entrance of air therein; substantially as described.

In testimony whereof we affix our signatures.

JAMES A. SINGMASTER.
FRANK G. BREYER.